(12) United States Patent
Axen et al.

(10) Patent No.: US 8,858,800 B2
(45) Date of Patent: Oct. 14, 2014

(54) MANUFACTURE OF CHROMATOGRAPHY MATRICES

(75) Inventors: Andreas Axen, Uppsala (SE); Gunnar Glad, Uppsala (SE); Henrik Ihre, Uppsala (SE); Anders Larsson, Uppsala (SE); Nils Norrman, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 84 days.

(21) Appl. No.: 11/996,357

(22) PCT Filed: Aug. 30, 2006

(86) PCT No.: PCT/SE2006/000993
§ 371 (c)(1),
(2), (4) Date: Jan. 22, 2008

(87) PCT Pub. No.: WO2007/027139
PCT Pub. Date: Mar. 8, 2007

(65) Prior Publication Data
US 2008/0237124 A1    Oct. 2, 2008

(30) Foreign Application Priority Data

Aug. 31, 2005 (SE) .................................. 0501936

(51) Int. Cl.
| | | |
|---|---|---|
| *B01D 15/36* | (2006.01) | |
| *B01J 39/26* | (2006.01) | |
| *B01J 20/289* | (2006.01) | |
| *B01J 39/18* | (2006.01) | |

(52) U.S. Cl.
CPC .............. *B01J 39/26* (2013.01); *B01J 20/289* (2013.01); *B01J 39/185* (2013.01); *B01D 15/362* (2013.01)
USPC ..... 210/656; 210/635; 210/198.2; 210/502.1; 502/404; 502/439

(58) Field of Classification Search
CPC ...... B01D 15/362; B01J 39/185; B01J 39/26; B01J 20/289
USPC ............ 210/635, 656, 198.2, 502.1; 502/404, 502/439; 521/33; 536/3, 112, 124
See application file for complete search history.

(56) References Cited

U.S. PATENT DOCUMENTS

| | | | |
|---|---|---|---|
| 2,580,352 A | 12/1951 | Grassie | |
| 3,651,041 A | 3/1972 | Schell et al. | |
| 4,067,825 A * | 1/1978 | Hradil et al. | 521/32 |
| 5,447,870 A * | 9/1995 | Lau | 436/528 |
| 5,451,662 A | 9/1995 | Naveh et al. | |
| 5,789,578 A | 8/1998 | Burton et al. | |
| 5,922,777 A * | 7/1999 | Van Rheenen | 521/28 |
| 5,998,606 A | 12/1999 | Grandics et al. | |
| 6,027,650 A * | 2/2000 | Van Reis et al. | 210/656 |
| 6,117,326 A * | 9/2000 | Schure et al. | 210/635 |
| 6,428,707 B1 | 8/2002 | Berg et al. | |
| 6,524,482 B2 * | 2/2003 | Bruening et al. | 210/651 |
| 6,602,990 B1 | 8/2003 | Berg et al. | |
| 6,884,345 B1 | 4/2005 | Irgum et al. | |
| 2003/0150805 A1 | 8/2003 | Collins et al. | |
| 2004/0050784 A1 | 3/2004 | Belew et al. | |
| 2008/0237124 A1 * | 10/2008 | Axen et al. | 210/635 |
| 2008/0249289 A1 * | 10/2008 | Axen et al. | 530/413 |

FOREIGN PATENT DOCUMENTS

| | | |
|---|---|---|
| EP | 1464391 | 6/2004 |
| JP | 10-330401 A | 12/1998 |
| WO | WO 98/33572 | 8/1998 |
| WO | WO03/040279 | 5/2003 |

OTHER PUBLICATIONS

Hjertén, S. (1964). "The Preparation of Agarose Spheres For Chromatography of Molecules and Particles". Biochimica et Biophysica Acta, 79, 393-398.
Janson, J., & Ryden, L. (Eds.). (1997). Protein Purification: Principles, High-Resolution Methods, and Applications, 2nd Ed. New York, NY: John Wiley & Sons, Table of Contents and publication information.
Johnston, S. T. & Deen, W. M. (1999). "Hindered convection of proteins in agarose gels". Journal of Membrane Science, 153(2), 271-279.
Engelhardt, H., et al., "Polymer Encapsulated Stationary Phases: Advantages, Properties and Selectivities", Chromatographia, 1989, vol. 27, No. 11/12, pp. 535-543.
Anonymous: CAPTO (TM)S, CAPTO 1 and CAPTO DEAE Data File Mar. 2005 pp. 1-8.
Anonymous: Screening and Optimization of the Loading Conditions on CAPTO S Application Note 28-4078-16 Mar. 2005 pp. 1-8.
EP06784126 Search Report Dated Apr. 4, 2013.

* cited by examiner

*Primary Examiner* — Ernest G Therkorn

(57) ABSTRACT

The present invention relates to a method of manufacturing a chromatography matrix comprising providing a polysaccharide carrier comprising available hydroxyl groups; and reacting said hydroxyl groups with vinyl sulphonate to provide a sulphonate-functionalized (S-functionalized) cation exchanger. The hydroxyl groups of the carrier may be hydroxyls of the agarose polymer; or alternatively they may be provided on extenders such as polyhydroxyfunctional polymers. In one embodiment, the carrier is made of agarose with improved flow pressure properties.

5 Claims, No Drawings

MANUFACTURE OF CHROMATOGRAPHY MATRICES

CROSS-REFERENCE TO RELATED APPLICATIONS

This application is a filing under 35 U.S.C. §371 and claims priority to international patent application number PCT/SE2006/000993 filed Aug. 30, 2006, published on Mar. 8, 2007, as WO 2007/027139, which claims priority to Swedish patent application number 0501936-9 filed Aug. 31, 2005.

FIELD OF THE INVENTION

The present invention relates to the manufacture of chromatography matrices, and more specifically to an advantageous method of manufacturing cation exchangers. The invention also embraces a chromatography column comprising said matrix, and the use thereof in a process of purification.

BACKGROUND OF THE INVENTION

There are many instances when it is required to separate one compound, such as a contaminant or a desired molecule, from a liquid or from other solid materials. Charge-charge based interactions are used in a number of fields to capture and hence separate charged or chargeable compounds.

In the detergent industry, methods and detergents are available to separate compounds such as soil and dirt from textile fabrics. A frequently encountered example is the laundry cleaning industry, where charged conditioners and detergents are commonly incorporated in washing powders for separating soil from the washed materials. Such charged conditioners, also known as benefit agents, are used either to directly release soil from the textile fibres; or to modify the fibres to facilitate the cleaning process; by the use of attractive forces between the soil and conditioner. To improve their effectiveness, it has been suggested to provide conditioners in a form wherein they are substituted onto another chemical moiety, which increases their affinity for the compound to be removed.

WO 03/040279 relates to polymers for laundry applications, and more specifically to the use of substituted polysaccharide structures for promoting soil release during the laundry of a textile fabric. The suitable polysaccharides include polysaccharides with a degree of polymerisation over 40, preferably in the range of 50-100 000. The polysaccharide structures disclosed have been substituted with an alkyl group, such as hydroxyalkyl, carboxyalkyl or sulphoalkyl or a salt thereof, coupled to the polysaccharide via ester or ether linkage. The average degree of substitution i.e. the average substitution of the functional groups on the repeating sugar unit is preferably from 0.1-3, more preferably from 0.1-1. According to WO 03/040279, polysaccharides can be used which have an α- or β-linked backbone, preferably a β-1,4-linked backbone. Since cellulose-based materials have been recognised in the art to adhere to cotton fibres, the preferred polysaccharide is cellulose.

In the chemical and biotech field, target compounds such as drug or drug candidates usually need to be separated from contaminating species originating from the process of manufacture. For example, a protein drug or drug candidate produced by expression of recombinant host cells will need to be separated e.g. from the host cells and possibly cell debris, other host cell proteins, DNA, RNA, and residues from the fermentation broth such as salts. Due to its versatility and sensitivity to the target compounds, chromatography is involved as at least one step in many of the currently used biotech purification schemes. The term chromatography embraces a family of closely related separation methods, which are all based on the principle that two mutually immiscible phases are brought into contact. More specifically, the target compound is introduced into a mobile phase, which is contacted with a stationary phase. The target compound will then undergo a series of interactions between the stationary and mobile phases as it is being carried through the system by the mobile phase. The interactions exploit differences in the physical or chemical properties of the components of the sample.

The stationary phase in chromatography is comprised of a solid carrier to which ligands, which are functional groups capable of interaction with the target compound, have been coupled. Consequently, the ligands will impart to the carrier the ability to effect the separation, identification, and/or purification of molecules of interest. Liquid chromatography methods are commonly named after the interaction principle utilised to separate compounds. For example, ion exchange chromatography is based on charge-charge interactions; hydrophobic interaction chromatography (HIC) utilises hydrophobic interactions; and affinity chromatography is based on specific biological affinities.

As is well known, ion exchange is based on the reversible interaction between a charged target compound and an oppositely charged chromatography matrix. The elution is most commonly performed by increasing the salt concentration, but changing the pH is equally possible. Ion-exchangers are divided into cation-exchangers, wherein a negatively charged chromatography matrix is used to adsorb a positively charged target compound; and anion-exchangers, wherein a positively charged chromatography matrix is used to adsorb a negatively charged target compound. The term "strong" ion exchanger is used for an ion-exchanger which is charged over broad pH intervals, while a "weak" ion-exchanger is chargeable at certain pH values. One commonly used strong cation exchanger comprises sulphonate ligands, known as S groups. In some cases, such cation exchangers are named by the group formed by the functional group and its linker to the carrier; for example SP cation exchangers wherein the S groups are linked by propyl to the carrier.

The properties of the carrier to which the ligands have been coupled will also affect the separation properties of a chromatography matrix. Depending on the intended mode of chromatography, carriers that are substantially hydrophilic or hydrophobic may be preferred. A further consideration of the carrier is the ease of which it is functionalized. Depending on the chemistry used for coupling ligands, the carrier may be activated i.e. transformed into a more reactive form. Such activation methods are well known in this field, such as allylation of the hydroxyl groups of a hydrophilic carrier, such as dextran or agarose. Covalent ligand attachment is typically achieved by the use of reactive functionalities on the solid support matrix such as hydroxyl, carboxyl, thiol, amino groups, and the like. In order to enhance the binding capacity of the matrix, a linking arm known simply as a linker is often provided between the ligand and carrier. Such linkers will physically distance the ligand from the carrier, whereby the target compound is allowed to interact with the ligand with minimal interference from the matrix. However, the use of linkers in the synthesis of chromatography matrices requires the use of a functional reagent having at least one functional group capable of reacting with a functional group on the surface of the matrix to form a covalent bond therewith; and at least one functional group capable of reacting with a functional group on the ligand to form a covalent bond therewith.

U.S. Pat. No. 5,789,578 (Massey University) relates to methods for the preparation of chromatography matrices comprising a support matrix having ligands capable of binding a target compound covalently attached thereto through a linking group comprising sulfide, sulfoxide, or sulfone functionality. Bisulphite is used as a reagent to provide S groups. More specifically, U.S. Pat. No. 5,789,578 uses allyl glycidyl ether, allyl halide or propargyl halide and conventional methods in the presence of a base to provide a carrier having ethylenically unsaturated entities pendent thereto. Specifically, the halide or glycidyl group reacts with matrix hydroxyl groups at alkaline pH. Under these conditions, the allyl group is expected to have limited reactivity with the matrix or water used in the reaction solution. The ethylenically unsaturated group is then reacted under free radical conditions with a thiol-containing ligand to provide for covalent linkage thereof.

However, the introduction of allyl groups and subsequent coupling of S groups as disclosed in the above-discussed U.S. Pat. No. 5,789,578 will leave a fraction of the allyl groups unreacted on the carrier while another fraction will be subject to the introduction of vicinal sulphonate-sulphinate groups. In addition, the activated reagents will also involve the risk of undesired cross-linking reactions. Obviously, any step added to a process of for example drug manufacture will make the process more costly, and it is therefore a general aim in chemical processing to make any process as brief as possible.

Thus, there is a clear need in this field of improved methods which allows functionalization of polysaccharide carriers in a faster and more robust way, preferably avoiding one or more of the above-discussed disadvantages.

SUMMARY OF THE INVENTION

In one aspect, the present invention provides a novel method of manufacturing a chromatography matrix comprising cation-exchanging groups.

In another aspect, the present invention relates to a method for the manufacture of a chromatography matrix comprising S groups coupled to a polysaccharide carrier, which method advantageously results in a more homogenous cation exchanger than the prior art methods.

In a further aspect, the invention relates to a chromatography matrix, which is capable of binding one or more immunoglobulins at increased capacity as compared to the prior art matrices.

Further details and advantages of the present invention will appear from the detailed description and claims that follows.

DEFINITIONS

The term "target compound" means herein any compound, molecule or other entity one wishes to isolate from an aqueous solution. The target compound may be the desired product, or an undesired contaminant of a liquid product.

The term "polysaccharide" includes as used herein natural polysaccharides, synthetic polysaccharides, polysaccharide derivatives, modified polysaccharides, and any mixture thereof.

The term "ligand" is used herein in its conventional meaning in chromatography for an entity comprising a functional group capable of interaction with a target compound.

Examples of groups of ligands are positively charged or chargeable groups (anion exchange ligands); negatively charged or chargeable groups (cation exchange ligands); hydrophobic groups; groups with a specific biological affinity for a target compound, such as the affinity of an antigen for an antibody (affinity ligands); etc.

The term "extender" means herein a polymer, which has been tethered to the surface of a carrier and hence function to extend the distance between ligand and carrier. One primary function of such an "extender" is to increase the binding capacity and mass transport of the target molecules by increasing the available surface area; and by providing flexible polymer chains for rapid surface diffusion and similar processes. Extenders are also known e.g. as "flexible arms", "tentacles" and sometimes "fluff". As the skilled person will understand, a linker as discussed will also provide certain degree of extension, but commonly a linker is comprised of a smaller number of atoms compared to the longer polymeric extender.

DETAILED DESCRIPTION OF THE INVENTION

Thus, the present invention relates to an improved method for the manufacture of a sulphonate-functionalized carrier. More specifically, in a first aspect, the invention relates to a method of manufacturing a chromatography matrix comprising providing a polysaccharide carrier comprising available hydroxyl groups (OH groups); and reacting said hydroxyl groups with vinyl sulphonate to provide a sulphonate-functionalized (S-functionalized) cation exchanger. In this context, it is understood that the term "available" means available for reaction. In one embodiment, the hydroxyl groups used in the reaction are hydroxyl groups originally present in the polysaccharide.

Thus, the present invention advantageously avoids the need of a pre-activating step of allylating a polysaccharide. Consequently, a faster and hence less costly method is provided by the invention, wherein the risk of side reactions as discussed above is substantially reduced. Thus, the present method results in a substantially homogenous product.

In this context, it is understood that the term "vinyl sulphonate" as used herein embraces both unsubstituted vinyl sulphonate as defined by formula (I)

$$CH_2=CH-SO_3 \qquad (I)$$

and substituted vinyl sulphonate as defined by formula (II) below

$$CHR_1=CR_2-SO_3 \qquad (II)$$

wherein at least one of $R_1$ and $R_2$ mat be any suitable substituent that does not confer any undesired interactions to the chromatography matrix.

Thus, in one embodiment of the present method, the hydroxyl groups are reacted with unsubstituted vinyl sulphonate as defined by formula (I) above. In an alternative embodiment, the hydroxyl groups are reacted with α-substituted or β-substituted vinyl sulphonate as defined by formula (II) above.

Suitable vinyl sulphonate is obtainable from commercial sources, such as Clariant GmbH. As understood by the skilled person in this field, the reaction will be a Michael addition, wherein the nucleophilic hydroxyl groups will attack the β-carbon of the vinyl sulphonate. Thus, in one embodiment, the S-functionalized cation exchanger obtained by the present method can be described schematically as carrier-linker-O—$CH_2$—$CH_2$—S.

As is well known, in Michael additions, hydroxide or alkoxide ions are commonly used as catalysts. The duration of the reaction may be up to 10 h, such as in the range of 4-6 h, and the temperature may be anywhere in the range of 20-80° C. In the present method, the reaction is advantageously carried out in an aqueous solvent, such as water. Thus, in one embodiment, a further advantage of the present method compared to the prior art methods is that it avoids the need to use volatile and toxic chemicals.

In an advantageous embodiment, the carrier comprises cross-linked polysaccharides. In a specific embodiment, the polysaccharide carrier has been prepared by a method that improves its rigidity and consequently its flow-pressure properties, which rigid polysaccharide is sometimes denoted "high flow" polysaccharide, such as high flow agarose. Thus, the first aspect of the invention also embraces a method that provides a sulphoalkyl-functionalized chromatography matrix as described above, wherein the carrier is made from any gelatable polysaccharide prepared by a method which improves its rigidity, which methods will be discussed in more detail below.

Thus, in the present method, the cross-linked carrier may be provided by:
(a) providing an aqueous polysaccharide solution and substituting part of the hydroxyl groups of said polysaccharide;
(b) gelling the polysaccharide solution to provide a carrier; and
(c) cross-linking the polysaccharide gel obtained from (b) by reacting hydroxyl groups of the polysaccharide.

In a first embodiment, the improvement of the polysaccharide rigidity is achieved by substitution with any suitable group which is not susceptible to nucleophilic attack, also known as a "non-reactive group". By substitution with non-reactive groups, the stability of the polysaccharide will be improved and it is easier to control the subsequent cross-linking step. In one embodiment, the non-reactive groups are selected from the group consisting of ethers, esters, amides and xantates.

In an alternative embodiment, the improvement of the polysaccharide rigidity is achieved by substitution with groups which are "reactive" in the present context, such as electrophilic groups or groups easily converted to electrophilic groups, such as e.g. allyl groups, epoxides, halohydrins, α,β-unsaturated carbonyls, which are all readily reactive with hydroxyl groups.

Thus, in the alternative embodiment, the substitution may be provided by adding a bifunctional cross-linking agent having one active site and one inactive site to a polysaccharide solution and allowing hydroxyl groups of the polysaccharide to react with the active site of the cross-linking agent; and the inactive site of the cross-linking agent is activated subsequent to the gelling of step (b); which activated site is then reacted with hydroxyl groups of the polysaccharide gel to cross-link the gel.

Consequently, in this embodiment, the method of manufacturing a chromatography matrix comprises:
a) adding a bifunctional cross-linking agent having one active site and one inactive site to a polysaccharide solution and allowing hydroxyl groups of the polysaccharide to react with the active site of the cross-linking agent;
b) providing a carrier by gelling the polysaccharide solution, such as by cooling;
c) activating the inactive site of the cross-linking agent;
d) reacting the activated site so obtained with hydroxyl groups of the polysaccharide gel to cross-link the gel;
e) reacting remaining hydroxyl groups with vinyl sulphonate to provide a sulphonate-functionalized (S-functionalized) cation exchanger.

The bifunctional cross-linking agent used in the present method will comprise one active site and one inactive. In this context, the term "active site" means all groups capable of reaction with the hydroxyl groups of the polysaccharide. Examples of such groups are halides, epoxides, methylol groups. The term "inactive site" refers to a group which is not reactive under the same reaction conditions as the reactive site, but which can later on be activated to react with the hydroxyl groups of the polysaccharide. Thus, suitable cross-linking agents are selected from the group consisting of allylglycidyl ether and allylhalides, such as allylbromide; N-methylol acrylamide; vinyl benzylchloride; and cinnamoyl chloride. In one embodiment, the bifunctional cross-linking agent is selected from the group comprising allylglycidyl ether, allylbromide and epichlorohydrin. The so cross-linked gel can be further cross-linked by conventional methods as known by the state of the art. Further details regarding steps (a)-(d) in the method above may be as provided in U.S. Pat. No. 6,602,990 (Berg), which is hereby incorporated herein via reference.

In order to obtain as high binding capacity as possible in chromatography, the carrier used in the present method should present as large a surface area available as possible binding target compounds. Consequently, in one embodiment, the carrier is porous. In this context, it is understood that groups available for reaction are commonly present both on external surfaces of the carrier and on surfaces of the pores that present a sufficient size.

Another or additional way of increasing the surface area of a chromatographic carrier is to provide one or more extenders between carrier and ligand. Hydrophilic extenders may comprise functionalities selected from the group consisting of hydroxy, carboxy, amino, repetitive ethylene oxide (—$CH_2CH_2O$—), and amido. In one embodiment, the extenders comprise hydrophilic polymers, such as polysaccharides. Illustrative polysaccharide extenders are starch; cellulose, such as cellulose ethers, e.g. hydroxyethyl cellulose; dextran, such as Mesenteroid B-512; and agarose.

Polyhydroxyfunctional polymers, such as polysaccharides, are preferred extenders due to their hydrophilicity and ample supply of reactive hydroxyl groups both for tethering and for attachment of ligands. In one embodiment, the extender is a polysaccharide selected from the group consisting of cellulose ethers; dextran; starch and starch derivatives; hemicellulose; pectin; plant seed gum (e.g. locust bean gum or guar gum); plant exudate gum (e.g. gum arabicum); pullulan; scleroglucan; and xanthan.

Thus, in one embodiment, the carrier used in the present method has been grafted with dextran to provide extenders, in which case the hydroxyls available for reaction will at least partly be originating from the dextran. Thus, in one embodiment, the present method comprises a step of providing the polysaccharide gel with extenders before the reaction with vinyl sulphonate. Dextran is readily available as a commercial product, e.g. from GE Healthcare (Uppsala, Sweden), and may be coupled to a polysaccharide carrier following well known methods. The most suitable molecular weight of dextran will depend on other conditions such as the pore size of the carrier, and may be in the range of 10-500 kDalton (kDa), such as 20-70 kD. In an advantageous embodiment, the dextran has been derived from *Leuconostoc mesenteroides*, and is of molecular weight of about 40 kD. In one embodiment, the dextran is medium branched, meaning that about 5% of the glucose residues are branching points.

In an alternative embodiment, the extenders comprise synthetic polymers. Such synthetic polymers may be selected from the group comprising polyvinyl alcohols; polyacryl- and polymethacrylamides; FICOLL™ (a sucrose-epichlorohydrin molecule); polyvinyl ethers, such as hydroxyfunctional polyvinylethers; polyglycerols; hydroxyfunctional polyacrylamides; hydroxyfunctional polymethacrylates; polyglycidol; and ethoxylated polyols.

As understood by the skilled person, the length (size) of the optimal extender will depend on several factors, such as number of attachment points to the carrier, the nature of the extender, the structure and size of the ligand as well as the number thereof per extender molecule. The molecular weight of the present extenders may be above 500 D, preferably above 1000 D and most preferably in the 5-500 kD range.

In one embodiment, the extenders are polymers which comprise reactive groups to which ligands can be attached according to well known methods. In an alternative embodiment, the ligands are attached to the extenders before tethering to the carrier surface, which is also easily achieved by the skilled person in this field. The attachment of extenders to the carrier is easily performed by the skilled person in this field, see e.g. U.S. Pat. No. 6,428,707 (Amersham Pharmacia Biotech AB), which is hereby included herein via reference.

As mentioned above, the polysaccharide carrier comprises hydroxyl groups available for chemical reaction. Thus, in providing the carrier, the polysaccharide may be any polysaccharide which is capable of forming a gel, such as agarose, agar, cellulose, dextran, starch, pectin, chitosan, konjac, carrageenan, gellan, alginate etc. In one embodiment, the polysaccharide carrier is selected from the group consisting of dextran and agarose. In an advantageous embodiment, the polysaccharide carrier is agarose. In a specific embodiment, the carrier is comprised of agarose gel, to which dextran extenders are coupled. In an alternative, specific embodiment, the carrier is comprised of dextran gel, to which dextran extenders are coupled.

It is well known in the field of chromatography that agarose constitutes a carrier the porosity of which will increase the surface available for ligand coupling. Thus, the choice of chromatographic carrier will be based on criteria different from those applied for the above-discussed products used in the detergent industry, where the chemical moiety that serves as a "carrier" of a charged group is selected to increase the overall attraction to textile materials.

The polysaccharide carrier may have been prepared by any conventional method well known in this field. Non-functionalized chromatographic carriers are commercially obtainable, such as SEPHAROSE™ (Amersham Biosciences, Uppsala, Sweden). The polysaccharide carrier may be of any suitable shape, such as particles, preferably essentially spherical particles, monoliths, membranes, filters, chips, capillaries or any other format.

In one embodiment of the present method, the carrier is comprised of gel particles, such as essentially spherical particles. Thus, in the method above, (b) comprises to prepares particles, which is easily achieved by the skilled person e.g. by suspension gelation of the agarose solution in an organic phase. Such particles are easily prepared by the skilled person in this field by conventionally used methods, see e.g. S. Hjertén: Biochim Biophys Acta 79(2), 393-398 (1964). In a specific embodiment, the average diameter of the particles is below about 400 µm, such as below about 200 µm. Thus, illustrative ranges of particle diameters are 10-100 µm, such as 20-80 µm, e.g. 30-50 µm or 50-70 µm.

In an alternative embodiment, the porous carrier comprises a membrane. Polysaccharide membranes are easily prepared by the skilled person in this field, see e.g. S. T. Johnston, W. M. Deen: J. Membr. Sci. 153 (1999) 271-179.

In a second aspect, the present invention relates to a chromatography matrix manufactured as described above. Such a matrix has been shown by the present inventors to present unexpected properties in terms of binding capacity.

In a fourth aspect, the present invention relates to a liquid chromatography column, which comprises sulphonate-functionalized (S-functionalized) polysaccharide carriers manufactured by reacting vinyl sulphonate with hydroxyl groups of the polysaccharide. In one embodiment, the column comprises a sulphonate-functionalized (S-functionalized) cation exchanger manufactured as described above.

In a specific embodiment, the present column comprises a chromatography matrix prepared as described above. The column may be made from any conventional material, such as biocompatible plastic, e.g. polypropylene, steel, such as stainless steel, or glass. The column may be of a size suitable for laboratory scale or large-scale purification. In a specific embodiment, the column according to the invention is provided with luer adaptors, tubing connectors, and domed nuts. The chromatography matrix may be packed in the column, or provided as a fluidised bed.

In one embodiment, the chromatography column according to the invention is of the kind known as a "limited-use" chromatography column, which in this context means a packed chromatography column which is most suitable for a limited number of uses, such as 1-10 times. Such limited-use products are commercially known as "disposable products".

In another aspect, the present invention relates to a process of isolating one or more target compounds, which comprises to pass a liquid comprising the target compound(s) across a porous sulphonate-functionalized (S-functionalized) agarose chromatography matrix manufactured by reacting vinyl sulphonate with hydroxyl groups of the agarose to adsorb the target compound(s); and recover said target compound(s) by contacting the chromatography matrix with an eluent. Thus, the present process is a method of cation exchange chromatography. In the most preferred embodiment, the chromatography matrix is as described above.

The principles of cation exchange chromatography are well known to those of skill in this field. Preferably, the chromatography matrix will be washed between adsorption and elution. As the skilled person in this field will realise, conventional buffers and conditions will be useful in this process. For a review of chromatography methods, see e.g. Protein Purification—Principles, High Resolution Methods and Applications (J.-C. Janson and L. Rydén, 1989 VCH Publishers, Inc.).

The process above may be used for isolation, such as separation or purification, of target compounds, such as biomolecules, such as proteins, e.g. monoclonal or polyclonal antibodies, peptides, such as dipeptides or oligopeptides, peptide nucleic acids, viruses, cells, such as bacterial cells, prions etc. In an advantageous embodiment, the target compound is a protein and the method provides a substantially pure protein. In the most advantageous embodiment, the target compound is an immunoglobulin, such as IgG.

Alternatively, the process is used to isolate cationic organic molecules, such as drug candidates. In an alternative embodiment, the process is used to identify any one of the above discussed target compounds, e.g. for diagnostic purposes. In yet another embodiment, the process is used to purify products for the food and beverage industry, such as various proteins originating from whey, sugar and sweetener solutions, amino acid containing solutions. Thus, the products of the present process may be drugs or drug targets, such as antibody-based drugs or diagnostics; vectors for use in therapy, such as plasmids or viruses for use in gene therapy; feed supplements, such as functionalized food; diagnostic agents etc. A specific application of a molecule purified according to the invention is as a drug for personalized medicine.

EXAMPLES

The present examples are provided for illustrative purposes only, and should not be construed as limiting the invention as defined by the appended claims. All references given below and elsewhere in the present specification are hereby included herein via reference.

Example 1

Coupling of S Groups to Agarose with Improved Flow/Pressure Properties

Example 1a

Vinyl Sulphonate Coupling According to the Invention

In the present example, the starting material was agarose gel particles prepared as described in U.S. Pat. No. 6,602,990 (Berg), i.e. agarose having improved flow/pressure properties.
Coupling Procedure Using Vinyl Sulphonate:

7 mL of drained gel was placed on a glass filter and washed 3 times with 15 mL of 30% vinyl sulphonic acid (VSA) (Fluka) in water. After the last washing, the gel was transferred to a reaction vessel and VSA solution added to a total volume of 9 mL. Thereafter 7 mL of 50% (18 M) sodium hydroxide stock solution was added. The reaction slurry was agitated and heated to 50° C. for 6 hours, where after the reaction was stopped by filtering of the gel from the reaction solution and washing the gel with several portions of water.

Example 1b (Comparative)

Conventional Sodium Bisulphite Coupling

The starting material was agarose gel particles as defined in Example 1a above.
Allylation:

100 ml of agarose particles were mixed with 12 mL of a 50% aqueous solution of NaOH and 0.5 g of NaBH$_4$. The mixture was stirred for 1 hour at 50° C. Allylglycidyl ether (60 ml) was added and the suspension was left at 50° C. under vigorous stirring for an additional 18 hours. After neutralisation with successive additions of 5M AcOH till a pH of 7 was reached, the mixture was filtered and the gel was washed successively, with 0.5 L ethanol, 1 L distilled water, 200 ml 0.2 M acetic acid and, 500 ml distilled water. The allyl content was 0.14 mmoles/mL.
SP Coupling Using Sodium Bisulphite:

To a stirred slurry of the above allylated agarose particles in water, total volume 130 mL, 28 g sodium bisulphite was added and the pH was controlled with NaOH. The reaction mixture was stirred with continuous air bubbling through the slurry at room temperature for 18 hours, and washed with distilled water. The ion capacity was 0.11 mmoles/mL Results The results of Example 1 are presented in Table 1 below.

Example 2

Coupling of S Groups Via Extenders to Agarose with Improved Flow/Pressure Properties

Example 2a

Vinyl Sulphonate Coupling According to the Invention

The starting material was agarose gel particles as defined in Example 1a above.
Epoxy-Activation Procedure:

55 g of the agarose gel was drained and stirred together with 15 mL distilled water in a temperature-controlled reaction vessel. 8.5 mL of 50% NaOH and 20 mg NaBH$_4$ were added and after 5 minutes of stirring, 14 mL of epichlorohydrin was added. The reaction slurry was stirred at 30° C. for 2 h, followed by multiple washings with distilled water in a glass filter funnel.
Dextran-Coupling Procedure:

21 g of Dextran T40 (Amersham Biosciences, Uppsala, Sweden) was dissolved in 25 mL of distilled water.

50 g of drained agarose gel particles prepared as described in Example 1a, which were epoxy-activated as described above, were added and stirred at 30° C. for 1 h.

2.5 mL of 50% NaOH was added and the slurry stirred at 30° C. for 18 h, followed by multiple washings with distilled water in a glass filter funnel.
Coupling Procedure Using Vinyl Sulphonate:

Vinyl sulphonate was used as described above under Example 1a to couple S groups to the extenders of the highly cross-linked agarose according to the invention.

Example 2b (Comparative)

Conventional Sodium Bisulphite Coupling

In this example, agarose gel particles as defined in Example 1a above were epoxy-activated and provided with dextran extenders as describe above under Example 2a.
SP-Coupling Using Sodium Bisulphite:

The reaction was carried out as described under Example 1b above.
Results

The results of Example 2 are presented in Table 1 below.

Example 3

Effect of Dextran Extenders

Example 3a

Coupling of S Groups Via Extenders to Agarose

Commercially available cross-linked agarose particles (SEPHAROSE™) were obtained from Amersham Biosciences, Uppsala, Sweden.

Epoxy-activation, coupling of dextran extenders and coupling of S groups using vinyl sulphonate was carried out as described above under Example 2a.

Example 3b

Coupling of S Groups to Agarose without Extenders

The starting material was commercially available agarose as described above under Example 3a.

The coupling of S groups using vinyl sulphonate was carried out as described above under Example 1a.
Results
The results of Example 3 are presented in Table 2 below.

Example 4

Ionic Capacity and Protein Binding

The products obtained from Examples 1-3 above were tested as described below. The results are provided in Table 1 (Examples 1 and 2) and Table 2 (Example 3).
Dextran Content Determination
The products of Examples 2a, 2b and 3a were tested with regard to the dextran content as follows. 1.0 mL of the dextran-modified gel was taken out and dried at 120° C. on an analytical balance equipped with a heating device. The corresponding epoxy-activated gel was used as a reference and analyzed in the same way as the dextran modified gel. The difference in weight between the reference gel and the dextran-coupled gel was considered to be the amount of coupled dextran, expressed in mg/mL gel.
Ion Capacity Determination
The chloride ion exchange capacity was determined by titration. A slurry of the gel was treated with 0.5 M HCl for three minutes and then washed thoroughly with 1 mM HCl. A sample of 1.0 ml gel was taken out. The sample was transferred to a titration vessel and 5 mL of water was added. The sample was then titrated with 0.1 M. NaOH to pH 7.0.
Protein Capacity Determination
The breakthrough capacity is determined in a HR5/5 column mounted to an ÄKTA™ (Amersham Biosciences, Uppsala, Sweden) 10/100 at a flow rate of 1 mL/min for Lysozyme and 0.5 mL/min for polyclonal immunoglobulin (IgG) in 50 mM acetate pH 4.75. The protein solution for the breakthrough capacity has a concentration of approximately 4.0 mg/ml. Dynamic protein binding capacities were determined as break trough curves and capacities were read at 10% of maximum $UV_{280}$ absorbance The breakthrough capacity method is performed as follows:
Adsorption buffer is pumped through the bypass position of the chromatography system until a stable baseline is reached. An auto zero is performed and ca: 10 ml of the protein solution (applied via super loop) is pumped through the system to obtain a stable 100% signal. The flow for this step is the same as during analysis, i.e. 300 cm/h (1 ml/min). The absorbance noted at 20% of 100% signal, is set in the breakthrough capacity method. After a stable base line with adsorption buffer is reached, again at bypass position, the frontal analysis is started. The method starts with a column equilibration with 10 ml adsorption buffer (app. 5 column volumes) through a column positioned in the system. Thereafter, an auto zero is performed and the protein solution is applied to the column until the 20% breakthrough is reached.
Results

TABLE 1

| Chromatography matrix | Dextran amount (mg/mL) | Ion capacity (μmol/mL) | Capacity for IgG (mg/mL) | Capacity for Lysozyme (mg/mL) |
|---|---|---|---|---|
| Ex. 1a | 0 | 107 | 23 | 54 |
| Ex. 1b | 0 | 121 | 13 | 71 |
| Ex 2a | 16 | 120 | 97 | 147 |
| Ex. 2b | 16 | 109 | 18 | 71 |

TABLE 2

| Chromatography matrix | Dextran amount (mg/mL) | Ion capacity (μmol/mL) | Capacity for IgG (mg/mL) | Capacity for Lysozyme (mg/mL) |
|---|---|---|---|---|
| Ex. 3a | 16 | 113 | 143 | 131 |
| Ex. 3b | 0 | 97 | 68 | 103 |

The above examples illustrate specific aspects of the present invention and are not intended to limit the scope thereof in any respect and should not be so construed. Those skilled in the art having the benefit of the teachings of the present invention as set forth above, can effect numerous modifications thereto. These modifications are to be construed as being encompassed within the scope of the present invention as set forth in the appended claims.

What is claimed is:

1. A method of manufacturing a chromatography matrix comprising
   providing at least one cross-linked agarose carrier comprising available hydroxyl groups; and
   reacting said hydroxyl groups with vinyl sulphonate to provide a sulphonate-functionalized (S-functionalized) cation exchanger;
   wherein the hydroxyl groups are coupled to the carrier surface via extenders that comprise dextran;
   further wherein the carrier is provided by:
   (a) providing an aqueous agarose solution and substituting part of the hydroxyl groups of said agarose;
   (b) gelling the agarose solution to provide a carrier; and
   (c) cross-linking the agarose gel obtained from (b) by reacting hydroxyl groups of the agarose.

2. The method of claim 1, wherein said substitution of hydroxyl groups as defined in (a) is provided by addition to the agarose solution of at least one bifunctional cross-linking agent having one active site and one inactive site and reacting such active sites with part of the hydroxyl groups of the agarose; wherein inactive sites of said added cross-linking agent are activated subsequent to the gelling as defined in (b); and wherein the so activated sites are reacted with hydroxyl groups of the agarose gel to provide the cross-linking as defined in (c).

3. The method of claim 1, wherein the carrier is porous.

4. The method of claim 1, wherein the carrier is comprised of essentially spherical gel particles.

5. The method of claim 1, wherein the carrier is a membrane.

* * * * *